F. W. WIESEBROCK.
Gas-Regulator.

No. 159,731.

Patented Feb. 9, 1875.

Witnesses:
Edwin James
K. V. Gordon

Inventor:
Frederick W. Wiesebrock.
per J. E. J. Holmead
Attorney.

UNITED STATES PATENT OFFICE.

FREDERICK W. WIESEBROCK, OF NEW YORK, N. Y., ASSIGNOR TO HENRY W. SHEPARD AND ROBERT SEAMAN.

IMPROVEMENT IN GAS-REGULATORS.

Specification forming part of Letters Patent No. 159,731, dated February 9, 1875; application filed January 14, 1875.

CASE A.

*To all whom it may concern:*

Be it known that I, FREDERICK W. WIESEBROCK, of the city and county of New York and State of New York, have invented an Improved Gas-Regulator or Governor, of which the following is a full, clear, and exact description, reference being had to the accompanying drawing and the letters of reference marked thereon, making part of this specification, in which—

Figure 1:
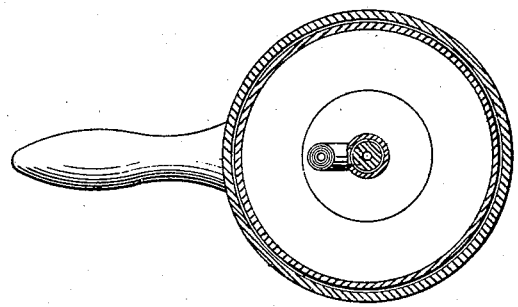
Figure 2:
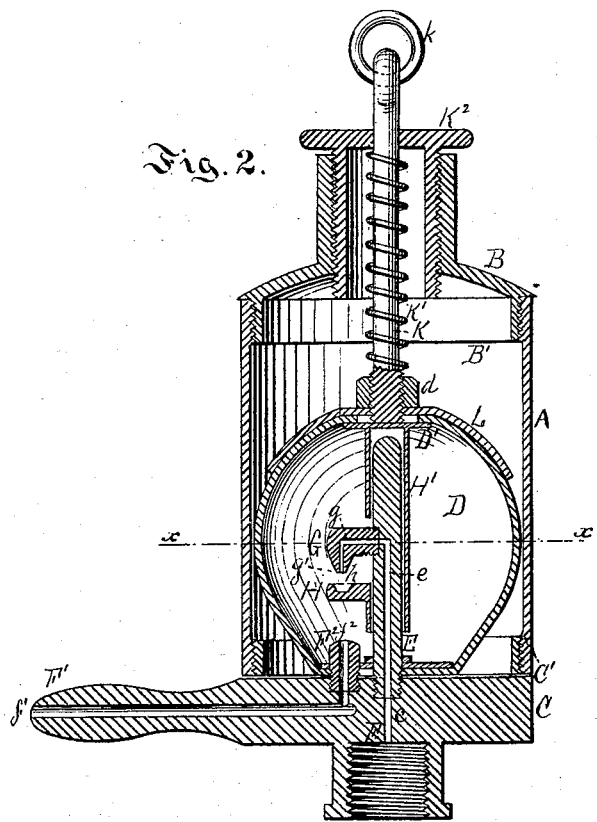

Figure 1 is a plan view on the line $x$ $x$, Fig. 2. Fig. 2 is a vertical sectional view.

My present invention relates to gas-regulators or governors, and is an improvement on the devices embraced in Letters Patent of the United States issued to me January 12, 1875, numbered, respectively, 158,767 and 158,768.

In my present improvement I retain the leading and distinguishing feature which constitutes the very essence of the inventions in the patents above referred to, and that is that, while the flow of the gaseous medium, be it carbonic-acid or any other gas, when turned on and the regulator is in operation shall, when the valve is closed, always be in contact with the upper face or surface thereof, but, at the same time, owing to the exceedingly diminutive size of the orifice or opening in the valve-seat, the valve shall be practically unaffected by the degree of the pressure of the gas in the gas-containing vessel or supply, and thus the valve is alone controlled through the adverse pressure in the chamber of the regulator itself, and acting purely automatically, as occasion requires, and entirely irrespective of the pressure in the gas-containing vessel.

In connection with the foregoing advantages, the nature of my present invention consists in connecting the valve, through suitable gearing, with an elastic gas-reception chamber secured within the shell or casing of the regulator or governor. The valve is movable, and acts in connection with a stationary seat. The chamber is contracted through the pressure of a spring, weights, or the atmosphere acting on the chamber, precisely in the same manner that they do on the elastic diaphragm or the plunger in my former patents, and is designed to operate in such manner that when the apparatus is attached to the gas-containing vessel and the vessel or other device it is designed to supply, the normal condition of the valve shall be that of being opened, and is only closed when the pressure of the gas in the elastic chamber is sufficient to overcome the pressure of the spring, weight, &c., so as to expand said chamber.

The construction and operation of my invention are as follows:

A is the shell or case of the regulator or governor, and may be of a cylindrical or any other desired form, and constructed of any suitable material. B C are end pieces, and are screwed onto the shell A and their joints rendered tight by means of elastic washers or other suitable packing B' C'. D is an interior chamber constructed of rubber or any other suitable elastic material, and is secured within the shell A and permanently attached to the inner surface of the end piece or bottom C. To the center of the end piece C, and in a suitable seat, is screwed or otherwise secured a stem or arm, E, and which is provided with an elbow-shaped channel, $e$, and which is connected with the channel $c$, and which leads directly into an opening, F, and to which the supply or inlet pipe is attached. This channel $e$ also leads into an elbow-shaped channel, $g$, cut through the valve-seat G. This valve G is secured directly to the stem or arm E, as clearly shown in Fig. 2. H is the valve, and may be recessed, as shown at $h$, or provided with a washer fitting in said recess, or of any other desired form that will correspond to the contour and closely fit against or close, when desired, the orifice $g'$ in the valve-seat G. The valve-seat G is cone-shaped and the face of the valve H simply of sufficient dimensions to securely close the diminutive orifice $g'$ of the seat. The area presented against which the pressure of the gas in the supply-vessel is exerted is therefore so small as to render said pressure practically inoperative in opening the valve. The valve H is connected, by suitable gearing H', to the upper section of the elastic chamber D. The gearing H' works on and around the stem or arm E. D' is a bearing or plunger, and which connects the valve-gearing to the inner surface of the upper section of the elastic chamber D. On the upper surface of this bearing D', and above the elastic chamber D, is a socket-seat, $d$, which is provided with a female screw-thread into which is screwed the rod K. $K^1$ is a coil-spring, and is secured around the rod K, having its seat on the upper surface of the bearing D', and its upper section resting against the under face of the adjustable screw-cap $K^2$, which is secured and works in a suitable tubular bearing on the upper surface of the head or end piece B. This screw-cap $K^2$ permits the tension or pressure of the spring to be regulated at pleasure. $k$ is a ring attached to the end of the rod K, and prevents the cap $K^2$ from being screwed up to such a position as to allow of its being entirely detached. This rod K, spring $K^1$, and screw-cap $K^2$ act in connection with the elastic chamber D precisely as similar devices act in connection with the plunger in my patent No. 158,768, and while they are admirably adapted for the purpose designed—that is, to regulate the degree of pressure that the chamber D, in a contracted condition, will resist before expanding to such a degree as to close the valve—I desire it distinctly understood that there is nothing arbitrary about their use, as weights might be substituted for the spring and screw-cap, or a weighted lever for the rod, spring, and screw-cap, or any other equivalent or well-known mechanical expedient, which would accomplish the desired end. L is a metallic diaphragm or shell, so curved as to allow of the expansion of the chamber, and may be, if desired, secured, as shown, to strengthen the elastic chamber D. $F^1$ is a discharge-pipe, and supplies the gas to the vessel in connection with which the regulator is used. The channel $f^1$ of the pipe connects with the channel $f^2$ of the nozzle $F^2$, which is screwed into the pipe $F^1$ and projects up into the elastic chamber D.

From the foregoing full and detailed description the operation of my present improvement will readily be understood. The pipe F is attached to the supply-vessel containing the gas, and the pipe $F^1$ to the vessel or device in connection with which the regulator is used, and which it is designed, as occasion requires, to charge or feed. The valve H, owing to its own gravity and that of its gearing, in its normal condition is always open, except when the cap $K^2$ is screwed up to such a position as to lift the ring $k$, and which, of course, would correspondingly draw up the rod K, and drive the valve H against its seat G, and close the orifice $g'$. We will now suppose the regulator to be connected to either a barrel of stock or Bass ale, or a keg of lager-beer, and to a supply-vessel charged with a high pressure, so that the vessel may contain the largest amount of gas which can safely be held within the prescribed area of its chamber. The valve being opened and the cock in the supply-pipe being now opened the gas will pass into the elastic chamber D, and through its pressure gradually expand said chamber, which, lifting the rod K and gearing H', will close the valve. A portion of the ale or beer in the vessel we will suppose is now drawn off, and it matters not whether it be a single glass or such a quantity as to leave but a single glass remaining, the gas from the elastic chamber D will instantly rush through the pipe $F^1$, so as to replace this displaced or drawn-off liquid. But so soon as the gas begins to pass out of the chamber D the degree of pressure is, of course, lessened, and the chamber begins to contract, and which, of course, again opens the valve, and sufficient gas passes in to fully charge the vessel and again expand the chamber, and which, of course, closes the valve. And thus automatically the valve is opened and closed, supplying any desired quantity of gas, and from a constantly-varying source, and entirely unaffected by the degree of pressure with which said source may be charged, as, owing to the exceeding small dimensions of the orifice $g'$ when the valve is closed, it is practically entirely unaffected by the degree of pressure in the gas-containing vessel. The degree of pressure which the elastic chamber will resist without so expanding as to close the valve can be adjusted and regulated at pleasure by means of screw-cap $K^2$, spring $K^1$, and rod K, or by means of weights applied to the rod, or by a weighted lever.

What I claim as new, and desire to secure by Letters Patent of the United States, is—

1. The elastic chamber D, inclosed in a suitable outer shell or casing, and having a supply and discharge pipe leading thereinto, in combination with a valve, H, and a valve-seat, G, whose orifice is connected with the channel of the supply-pipe, the whole being combined and arranged to operate as and for the purpose specified.

2. In combination with an elastic chamber, D, and a valve, H, the rod K, spring $K^1$, and screw-cap $K^2$, the whole being constructed and arranged to operate substantially as described.

In testimony whereof I have signed my name to this specification in the presence of two subscribing witnesses.

FREDERICK W. WIESEBROCK.

Witnesses:
H. W. SHEPARD,
JOHN B. BAKER.